No. 645,059. Patented Mar. 13, 1900.
H. BECKER.
HERNIAL TRUSS.
(Application filed Apr. 26, 1899.)
(No Model.)
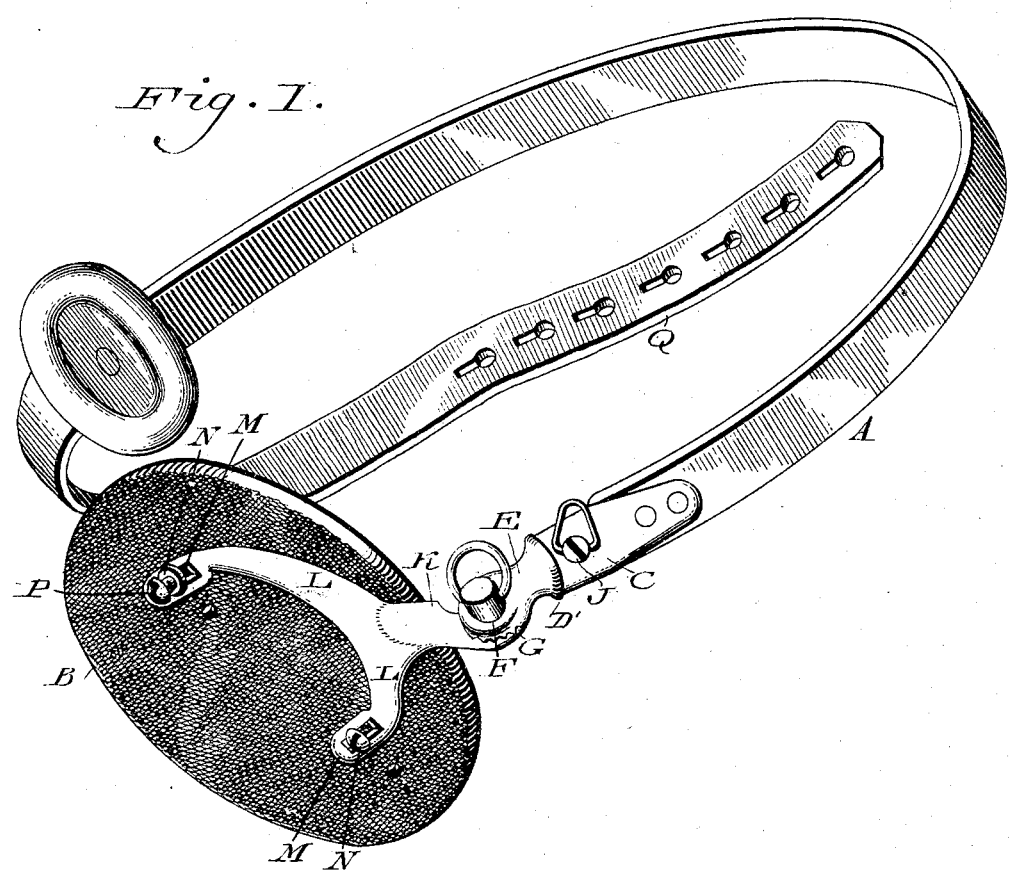
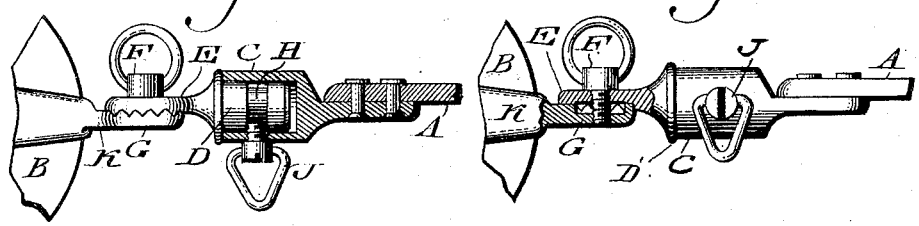
Witnesses
O. F. Hagle
L. Douville
Inventor
Herman Becker
By Niedersheim & Fairbanks
Attorneys

United States Patent Office.

HERMAN BECKER, OF PHILADELPHIA, PENNSYLVANIA.

HERNIAL TRUSS.

SPECIFICATION forming part of Letters Patent No. 645,059, dated March 13, 1900.

Application filed April 26, 1899. Serial No. 714,490. (No model.)

*To all whom it may concern:*

Be it known that I, HERMAN BECKER, a citizen of the United States, residing in the city and county of Philadelphia, State of Pennsylvania, have invented a new and useful Improvement in Trusses, which improvement is fully set forth in the following specification and accompanying drawings.

My invention consists of a truss adapted as a support for the abdomen, more particularly on the walls of an incision therein after an operation for appendicitis, so as to prevent the possibility of hernia or rupture, said support being so constituted that its pad may be adjusted according to requirements of locality, the angle or anatomy of the abdomen, the inclination of the groin, the pressure to be exerted, &c.

Figure 1 represents a perspective view of a truss or abdominal support embodying my invention. Figs. 2 and 3 represent side views, partly sectional, of detached portions.

Similar letters of reference indicate corresponding parts in the figures.

Referring to the drawings, A designates the spring or band of the truss, and B the pad thereof. To the end of the spring next to the pad there is secured the boss or socket C, in which is freely fitted the stem D, to whose outer end is attached the plate E, which by means of the screw F is connected with the plate G, the contiguous faces of said plates E and G being serrated and thus interlocking. At the place of junction of the stem D and the plate E is the flange D', which rests freely on the open end of the socket C and closes the same for preventing the entrance of dirt, &c., there and serving to relieve the socket from the injurious effect of lateral strain imparted to said stem. The stem D has in its periphery the groove H, forming a neck which is engaged by the point of the screw J, the latter being fitted in a threaded opening in the wall of the boss C, whereby its point may be made to engage with and tighten against the stem D and prevent rotation of the same and parts connected therewith. It will now be seen that the pad may be turned on the boss C as a bearing or on the screw F as an axis, and thus have its angles changed from said bearing and axis as centers independently of each other.

Attached to and extending from the plate G is the shank K, which terminates in the bifurcation or arms L, the ends of which have slots M therein to receive the screws N, which enter the pad B, thus adjustably connecting said pad with said arms K.

On one of the screws N is a button P, which is adapted to be engaged by the strap Q of the spring A for holding the device on the abdomen, it being noticed that when the screw J is loosened the pad may turn in the direction afforded by the rotation of the stem D. When the screw F is loosened, the pad may be turned with the plate G, the screw F being the axis. Again, when the screws N are loosened the pad may be shifted on the arms L to the right or left or to be set in or out, as the case may be, it being evident when the adjustments are accomplished the screws are tightened to control the parts, the adjustments being of course independent of each other, and thus when the support is applied the pad occupies its desired position relatively to the anatomy of the abdomen, groin, &c., exerts the proper pressure thereon, and accomplishes its work without severity, while being of inexpensive and non-complicated construction.

The plates or arms E and G and the screw F, passing therethrough, form a joint which is at a right angle to the pad B, so that assisted by the rotatable stem D, which is connected with the plate E, said pad may be set at the proper place and at the desired angle over the incision to properly bridge the walls of the same and produce the best effects on said walls.

It will be understood that an incision in the operation for appendicitis is made as a rule in the right side of the abdomen. In the use of the supporter it is applied from the opposite or left side of the body, so that the pad exerts an equal pressure against the walls of the abdomen on both sides of said incision. The screw F will be above and the screw J in front, so as to be the most convenient of access, so as to effect proper adjustment in each particular case.

Having thus described my invention, what I claim as new, and desire to secure by Letters Patent, is—

A spring and a strap, in combination with the socket C, the stem D having the neck H thereon, the same occupying said socket, the screw J which passes through the wall of said socket and enters said neck, the serrated plate E connected with said stem, the serrated plate G engaging said serrated plate E, the tightening-screw F for said plates, the shank K attached to the plate G, the arms L extending from said shank, the slots M in said arms, the pad B, the screws N passing through said slots into said pad, and means on said pad for connecting said strap therewith.

HERMAN BECKER.

Witnesses:
  JOHN A. WIEDERSHEIM,
  WM. C. WIEDERSHEIM.